United States Patent [19]

Christian et al.

[11] Patent Number: 5,446,924
[45] Date of Patent: Aug. 29, 1995

[54] METHOD FOR ASSURING DATA INTEGRITY DURING A REPEATER TRANSITION

[75] Inventors: Paul R. Christian, Crystal Lake; Scott G. Chapman, Schaumburg, both of Ill.

[73] Assignee: Motorola, Inc., Schaumburg, Ill.

[21] Appl. No.: 55,332

[22] Filed: May 3, 1993

[51] Int. Cl.⁶ .............................................. H04B 3/36
[52] U.S. Cl. ......................................... 455/8; 455/9; 455/53.1; 455/67.1; 455/115; 395/181
[58] Field of Search ................. 455/8, 9, 51.2, 67.1, 455/115, 103, 67.7, 53.1, 33.1; 371/8.2, 9.1, 7; 375/107, 108, 357; 340/825.01

[56] References Cited

U.S. PATENT DOCUMENTS

| | | | |
|---|---|---|---|
| 2,597,043 | 5/1952 | Treadwell | 455/8 |
| 4,984,240 | 1/1991 | Keren-Zvi et al. | 371/8.2 |
| 4,985,904 | 1/1991 | Ogawara | 455/8 |
| 5,129,096 | 7/1992 | Burns | 455/54.1 |
| 5,268,897 | 12/1993 | Komine et al. | 455/8 |

Primary Examiner—Reinhard J. Eisenzopf
Assistant Examiner—Doris To
Attorney, Agent, or Firm—D. Andrew Floam

[57] ABSTRACT

In a paging system that includes a system controller, an active repeater, and a backup repeater, data integrity during a repeater transition is assured. As each repeater receives a stream of paging information from the system controller, the repeaters store it. When the repeater transition occurs, the backup repeater determines the paging messages that were not transmitted during the repeater transition based on the most recently stored stream of paging information. Subsequently, the backup repeater transmits a paging failure message to the system controller indicating the paging messages that were not transmitted. Upon receiving this, the system controller commands the backup repeater to retransmit the paging messages that were not transmitted during the repeater transition.

12 Claims, 3 Drawing Sheets

METHOD FOR ASSURING DATA INTEGRITY DURING A REPEATER TRANSITION

FIELD OF THE INVENTION

This invention relates generally to repeater transitions in a paging system and, in particular, to assuring data integrity during the repeater transitions.

BACKGROUND OF THE INVENTION

Paging systems are known to comprise a plurality of phone lines, a paging terminal, a system controller, a plurality of active/backup repeater pairs for redundancy, and paging receivers. Typically, to page a subscriber (paging receiver), a telephone call is placed. The telephone call is received by the paging terminal via the phone lines and contains paging information which indicates the address of a target paging unit and a telephone number of the person who initiated the page. The paging terminal transmits the paging information to the system controller. The system controller transmits the paging information to all the repeaters (backup and active) which, in turn, broadcast the paging information to the paging units within the coverage area of the system. Although all paging units within the coverage area receive the paging message, only the addressed or target paging unit responds by alerting the subscriber of the received paging message.

Active and backup repeater pairs are desirable in paging systems because they minimize system downtime and minimize the loss of paging messages. However, when a repeater transition occurs, i.e. the active repeater is disabled and the backup repeater becomes active, paging messages are lost, or not transmitted, during the transition. This results in target paging units not receiving paging messages and thus not alerting the respective subscribers.

Therefore, a need exists for a method that assures data integrity during a repeater transition such that paging information is not lost during the transition.

DESCRIPTION OF A PREFERRED EMBODIMENT

Generally, the present invention provides a method for assuring data integrity during a repeater transition (a backup repeater becoming active due to the active repeater failing). The method uses data storage capabilities in both an active and a backup repeater pair in order to provide the ability to retrieve and retransmit paging information that would normally be lost during a repeater transition. Each repeater pair stores paging information for a predetermined period of time which is greater than the time it takes a repeater transition to occur. When a repeater transition occurs, the backup repeater informs a system controller of the transition and after prompting from the system controller, retransmits the paging messages that were being broadcasted during the transition. The system controller also prevents new paging messages from being broadcasted while the other paging messages are being retransmitted.

Figure 1:
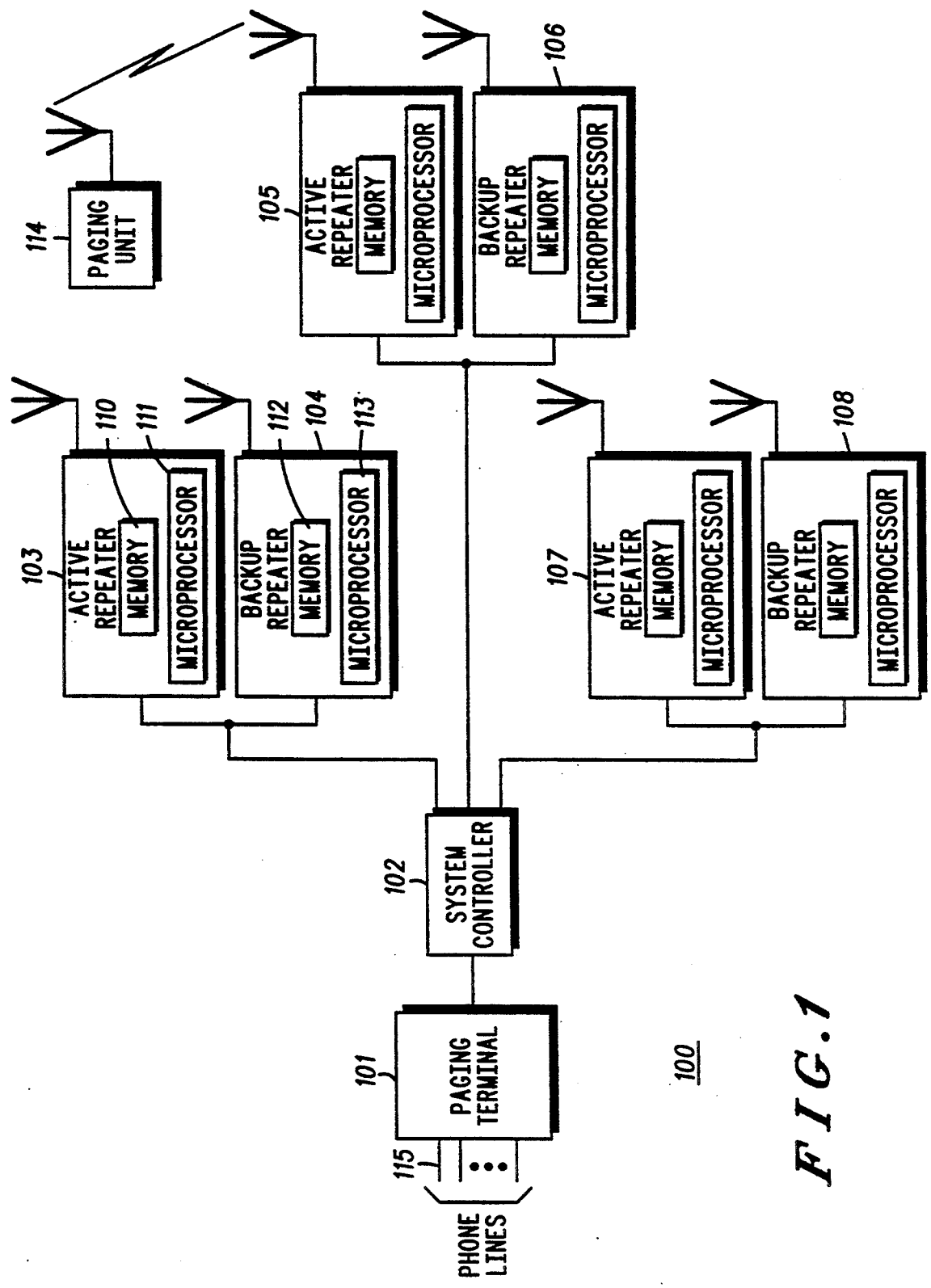
FIG. 1 illustrates a paging system in accordance with the present invention.

The present invention can be more fully described with reference to FIGS. 1–4. FIG. 1 illustrates a paging system 100 that comprises a paging terminal 101 which collects paging requests from a plurality of phone lines 115, a system controller 102, a plurality of active/backup repeater pairs 103–108 (3 pairs shown), and paging units 114 (only one shown). As is known, paging requests are received by the paging terminal 101 via the phone lines 115. The paging terminal 101 supplies the paging requests to the system controller 102 which routes the paging requests to the repeaters 103–108. The active repeaters 103, 105, and 107 broadcast the paging requests such that the paging unit 114 may receive it. The functionality of these elements, as well as the types, are well known thus no further discussion will be presented, except to facilitate the understanding of the present invention.

Each active repeater 103, 105 and 107 includes a microprocessor ($\mu$P) 111 and a memory device 110. The active repeater is under the control of the $\mu$P 111 and normally stores paging information in the memory device 110 while simultaneously transmitting it to the paging unit 114. The $\mu$P 111 may comprise a Motorola MC68HC11 or other known microprocessor suitable for control purposes. The memory device 110 may comprise RAM (Random Access Memory), EEPROM (Electrically Erasable Programmable Read Only Memory), or other known devices capable of storing information. As is known, all active repeaters transmit paging information at the same time in order to provide simulcast coverage to paging units 114 that may be in a wide area system.

Each backup repeater 104, 106, and 108 includes a $\mu$P 113 and a memory device 112. The backup repeater is under the control of the $\mu$P 113 and normally stores identical paging information in the memory device 112 as the active repeater 103, 105, and 107 in preparation for a potential repeater transition. The $\mu$P 113 may comprise a Motorola MC68HC11 or other known microprocessor suitable for control purposes. The memory device 112 may comprise RAM (Random Access Memory), EEPROM (Electrically Erasable Programmable Read Only Memory), or other known devices capable of storing information. As is known, the backup repeater 104, 106, and 108 does not transmit the paging information to the paging unit 114 during normal operation.

If the active repeater 103 has an operational failure (which are known), a repeater transition occurs where the active repeater 103 is switched out of operation and the backup repeater 104 takes over for it. During the transition, a predetermined period of time sufficient to allow the active repeater's 103 RF (radio frequency) circuits to de-energize is required. Following expiration of the predetermined period of time, all applicable control and RF paths are switched from the active 103 to the backup repeater 104. A second predetermined period of time is required to allow for complete switch over of control and RF paths as well as energizing of backup repeater's 104 RF circuits. The two predetermined periods of time comprise the transition time where paging information can not be transmitted to the paging unit 114 as a result of the repeater transition. After the transition, the backup repeater 104 informs the system controller 102 that a repeater transition has occurred.

Figure 2:
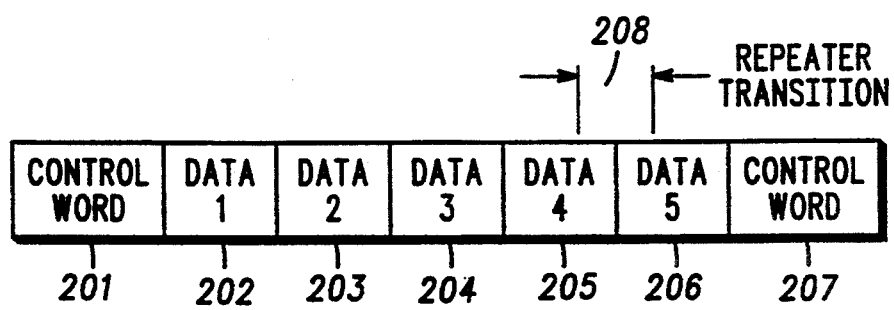
FIG. 2 illustrates a stream of paging information in accordance with the present invention.

FIG. 2 illustrates a stream of paging information 200 that comprises a control word 201, multiple paging messages 202–206, and a second control word 207. A repeater transition 208 is shown to have occurred during paging messages 205 and 206. (Note that a repeater transition may encompass any number of paging messages.) The control word 201, which is generated by the system controller 102, is used by the active repeater 103 to identify the paging messages 202–206 in the stream of paging information. The $\mu P$ 111 within the active repeater 103 decodes and differentiates each paging message in a manner similar to that done in the paging unit 114 such that individual paging messages can be identified. Similarly, the $\mu P$ 113 within the backup repeater 104 decodes and differentiates the paging messages. With the backup repeater 104 decoding the paging messages, the backup repeater can identify paging messages occurring during the repeater transition 208. From FIG. 2, the paging messages that were occurring during the transition 208 are paging messages 205 and 206 and thus need to be retransmitted, or rebroadcasted.

Figure 3:
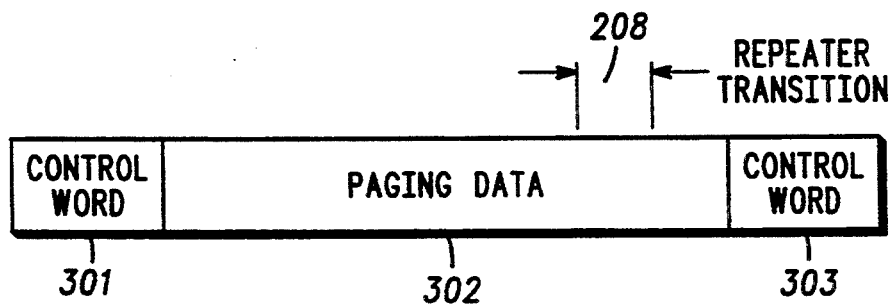
FIG. 3 illustrates an alternate stream of paging information in accordance with the present invention.

FIG. 3 illustrates a stream of paging information 300 that comprises a control word 301, paging data 302, which contains at least one paging message, and a second control word 303. A repeater transition 208 is shown to have occurred during the paging data 302. The control word 301, which is generated by the system controller 102, is used by the active repeater 103 to identify the stream of paging data 302. The $\mu P$ 111 within the active repeater 103 determines that control words 301 and 303 bound the stream of paging data 302, which was occurring during the repeater transition 208. Similarly, the $\mu P$ 113 within the backup repeater 104 determines that control words 301 and 303 bound the stream of paging data 302, and therefore identifies the paging data 302 for re-transmission.

Figure 4:
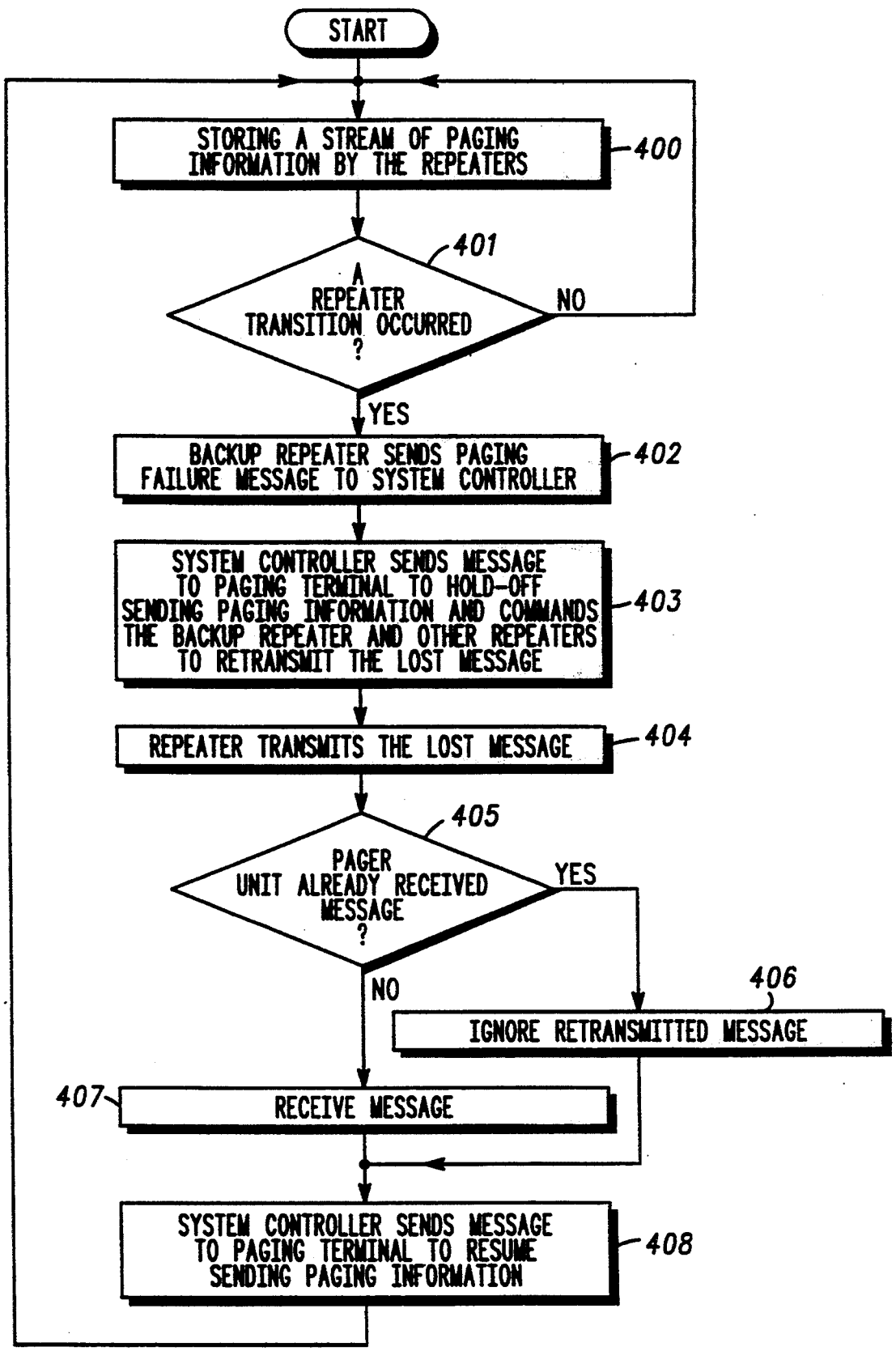
FIG. 4 illustrates a logic diagram that may be used to implement the present invention.

FIG. 4 illustrates a logic diagram that may be used by the system controller and the repeaters 103–108 to implement the present invention. At step 400 both the active repeater and backup repeater store paging information for a predetermined period of time. The period is of such length to guarantee that all paging messages present during a repeater transition are stored. The period must also be of adequate length to assure that the backup repeater has stored all paging messages following a previous code word. Technology and cost constraints place an upper bound on this period as only a finite amount of storage is required, for example 5 seconds. During this step, the active repeater transmits all paging information to the paging unit while the backup repeater merely stores the paging information.

If a repeater transition does not occur 401, both repeaters (active and backup) return to 400 where old paging information may be removed from storage and replaced with present paging information. When the repeater transition occurs 401, the backup repeater transmits a paging failure message to the system controller 402 indicating that the active repeater is no longer in operation and that the backup repeater has taken over for it. In cases where repeaters are capable of decoding individual paging messages as in FIG. 2, this message will also inform the system controller which specific paging messages were present during the repeater transition.

The system controller commands the paging terminal to hold off transmitting any new streams of paging information 403 in order to allow the repeaters in the paging system to re-transmit paging messages that may have been lost during the repeater transition. In these cases, the paging messages to be retransmitted are retrieved from the backup repeater's memory storage. In cases where repeaters are capable of decoding individual paging messages as in FIG. 2, the system controller commands all active repeaters (including the backup unit that initiated transition) to re-transmit specific messages that may have been lost 403. In cases where the repeaters are only capable of distinguishing paging data from control data as in FIG. 3, the system controller commands all active repeaters (including the backup unit that initiated transition) to re-transmit the entire stream of paging data following the control word which preceded the transition 403.

After receiving the command to re-transmit the lost paging messages, all active repeaters (including the backup repeater that initiated the transition) transmit the same paging messages that may not have been received by the paging receivers due to the repeater transition 404. Simulcasting of repeaters will require that all repeaters process the re-transmit command and transmit the lost paging messages at the same time such that all paging messages reach the paging units simultaneously. To one skilled in the art, it is readily apparent that an alternate embodiment may comprise having only the backup repeater of the failed active repeater re-transmit the lost paging message(s), or having a portion of the active repeaters (along with the backup repeater that initiated the transition) in the paging system re-transmit the lost message (s).

Note that in simulcast systems, a given paging unit may not have originally been in the region of the failed repeater and thus received the lost paging messages from other active repeaters. In cases where the repeaters are only capable of distinguishing paging data from control data as in FIG. 3, all paging messages prior to repeater transition were probably received by the paging unit. In this case, when the lost message(s) are re-transmitted, the paging unit may receive the identical paging message(s) twice. If the paging unit validly received the lost paging messages 405 during an initial transmission by another active repeater, it ignores the duplicate re-transmitted message 406. If the paging unit has not previously received the re-transmitted message 405, it receives the message 407 and processes it normally.

Once the active repeaters have re-transmitted the paging messages to paging units, the system controller removes the hold-off on the paging terminal. The paging terminal then resumes sending new paging information to the system controller and normal operation proceeds.

The present invention provides a method to insure data integrity during a repeater transition in a single site or wide area paging system. With such a method, the system does not lose any paging messages. Furthermore, the present invention provides for two types of data re-playing (re-transmission). One type requires the repeaters to decode and differentiate individual paging messages so that only the messages actually corrupted by the transition are re-transmitted. The second type allows repeaters to re-transmit the entire batch of paging data between control words.

We claim:

1. In a paging system that includes a paging terminal, a system controller, and a plurality of repeaters distributed throughout a coverage area, wherein at least two repeaters of the plurality of repeaters are located at a given site, and wherein one of the at least two repeaters functions as an active repeater while another repeater of the at least two repeaters functions as a backup repeater for information transmission in an event that the active repeater experiences operational failure, a method for assuring data integrity during a transition of information transmission from the active repeater to the backup repeater, the method comprising the steps of:

a) storing, by each of the plurality of repeaters, a stream of paging information for a predetermined period of time, wherein the paging information includes a control word that identifies at least one paging message;

b) determining in response to detection of the transition by the backup repeater associated with the active repeater experiencing operational failure, the at least one paging message that was not transmitted during the repeater transition based on most recently stored control word;

c) transmitting, by the backup repeater associated with the transition, a paging failure message to the system controller, wherein the paging failure message indicates that the at least one paging message was not transmitted; and d) commanding, by the system controller, at least the backup repeater associated with the repeater transition to retransmit the at least one paging message that was not transmitted.

2. The method of claim 1, and further comprising the step of commanding, by the system controller, the paging terminal to hold off transmitting a new stream of paging information until the at least one paging message that was not transmitted has been retransmitted.

3. The method of claim 1, and further comprising the step of ignoring, by a pager unit, the at least one paging message that was retransmitted when the pager unit validly received the at least one paging message during an initial transmission by another active repeater.

4. The method of claim 1, wherein step (d) further comprises commanding, by the system controller, each of active repeaters to retransmit the at least one paging message that was not transmitted.

5. In a paging system that includes a paging terminal, a system controller, and a plurality of repeaters distributed throughout a coverage area, wherein at least two repeaters of the plurality of repeaters are located at a given site, and wherein one of the at least two repeaters functions as an active repeater while another repeater of the at least two repeaters functions as a backup repeater for information transmission in an event that the active repeater experiences operational failure, a method for the backup repeater to assure data integrity during a transition of information transmission from the active repeater to the backup repeater, the method comprising the steps of:

a) storing, by the backup repeater, a stream of paging information for a predetermined period of time, wherein the paging information includes a control word that identifies at least one paging message;

b) determining, by the backup repeater, that the transition occurred and that at least one paging message was not transmitted by the active repeater;

c) transmitting, by the backup repeater, a paging failure message to the system controller, wherein the paging failure message indicates that the at least one paging message was not transmitted; and d) retransmitting in response to a retransmit command received from the system controller by the backup repeater, the at least one paging message that was not transmitted.

6. In a paging system that includes a paging terminal, a system controller, and a plurality of repeaters distributed throughout a coverage area, wherein at least two repeaters of the plurality of repeaters are located at a given site, and wherein one of the at least two repeaters functions as an active repeater while another repeater of the at least two repeaters functions as a backup repeater for information transmission in an event that the active repeater experiences operational failure, a method for the system controller to assure data integrity during a transition of information transmission from the active repeater to the backup repeater, the method comprising the steps of:

a) receiving a paging failure message from the backup repeater associated with the transition, wherein the paging failure message indicates that at least one paging message was not transmitted due to the transition;

b) transmitting a paging message hold-off command to the paging terminal, such that the paging terminal temporarily stops transmitting new streams of paging information; and c) transmitting a retransmit command to at least the backup repeater, such that at least the backup repeater retransmits the at least one paging message that was not transmitted.

7. In a paging system that includes a paging terminal, a system controller, and a plurality of repeaters distributed throughout a coverage area, wherein at least two repeaters of the plurality of repeaters are located at a given site, and wherein one of the at least two repeaters functions as an active repeater while another repeater of the at least two repeaters functions as a backup repeater for information transmission in an event that the active repeater experiences operational failure, a method for assuring data integrity during a transition of information transmission from the active repeater to the backup repeater, the method comprising the steps of:

a) storing, by each of the plurality of repeaters, a stream of paging information for a predetermined period of time, wherein the paging information includes a control word that identifies a plurality of paging messages;

b) determining in response to detection of the transition by the backup repeater associated with the active repeater experiencing operational failure, when the backup repeater became active in relation to reception of a control word immediately preceding the transition;

c) determining, by the backup repeater associated with the transition, paging messages of the plurality of paging messages that were not transmitted during the repeater transition based on a duration of the transition;

d) transmitting, by the backup repeater associated with the repeater transition, a paging failure message to the system controller, wherein the paging failure message indicates the paging messages that were not transmitted; and e) commanding, by the system controller, at least the backup repeater associated with the repeater transition to retransmit the paging messages that were not transmitted.

8. The method of claim 7, and further comprising the step of commanding, by the system controller, the paging terminal to hold off transmitting a new stream of paging information until the paging messages that were not transmitted have been re-transmitted.

9. The method of claim 7, and further comprising the step of ignoring, by a pager unit, the paging messages that were retransmitted when the pager unit validly received the paging messages during an initial transmission by another active repeater.

10. The method of claim 7, wherein step (d) further comprises commanding, by the system controller, each of active repeaters to retransmit the paging messages that were not transmitted.

11. In a paging system that includes a paging terminal, a system controller, and a plurality of repeaters distributed throughout a coverage area, wherein at least two repeaters of the plurality of repeaters are located at a given site, and wherein one of the at least two repeaters functions as an active repeater while another repeater of the at least two repeaters functions as a backup repeater for information transmission in an event that the active repeater experiences operational failure, a method for the backup repeater to assure data integrity during a transition of information transmission from the active repeater to the backup repeater, the method comprising the steps of:

a) storing, by the backup repeater, a stream of paging information for a predetermined period of time, wherein the paging information includes a control word that identifies a plurality of paging messages;

b) determining, by the backup repeater, that the transition occurred and determining paging messages that were not transmitted by the active repeater;

c) transmitting, by the backup repeater, a paging failure message to the system controller, wherein the paging failure message-indicates that the paging messages were not transmitted; and d) retransmitting in response to a retransmit command received from the system controller, by the backup repeater, the paging messages that were not transmitted.

12. In a paging system that includes a paging terminal, a system controller, and a plurality of repeaters distributed throughout a coverage area, wherein at least two repeaters of the plurality of repeaters are located at a given site, and wherein one of the at least two repeaters functions as an active repeater while another repeater of the at least two repeaters functions as a backup repeater for information transmission in an event that the active repeater experiences operational failure, a method for the system controller to assure data integrity during a transition of information transmission from the active repeater to the backup repeater, the method comprising the steps of:

a) receiving a paging failure message from the backup repeater associated with the repeater transition, wherein the paging failure message indicates paging messages that were not transmitted due to the repeater transition;

b) transmitting a paging message hold-off command to the paging terminal, such that the paging terminal temporarily stops transmitting paging information; and c) transmitting a retransmit command to at least the backup repeater, such that at least the backup repeater retransmits the paging messages that were not transmitted.

* * * * *